United States Patent [19]

Moncada

[11] Patent Number: 5,793,466
[45] Date of Patent: Aug. 11, 1998

[54] EYE COLOR HIGHLIGHTING CONTACT LENS

[76] Inventor: Juliette R. Moncada, 19072 Florida St. #B, Huntington Beach, Calif. 92648

[21] Appl. No.: 703,636

[22] Filed: Aug. 27, 1996

[51] Int. Cl.[6] ............................. G02C 7/04; G02C 7/10
[52] U.S. Cl. ............................. 351/162; 351/160 H
[58] Field of Search ..................... 351/160 R, 160 H, 351/161, 162

[56] References Cited

U.S. PATENT DOCUMENTS 3,454,332  7/1969  Siegel ........................... 351/162
5,260,727  11/1993  Oksman et al. ................. 351/162
5,495,305  2/1996  Martin et al. .................. 351/162

Primary Examiner—Scott J. Sugarman

[57] ABSTRACT

A eye color highlighting contact lens comprises a contact lens formed in a generally semispherical configuration, the contact lens having a convex outer surface, a concave inner surface and a periphery; a center circle being positioned upon the outer surface of the lens, in an operative orientation the center circle circumscribing a user's pupil; and a plurality of short, medium and long colored lines, the lines being positioned in a random array in at least one generally circular pattern, in an operative orientation a user positioning the lens on his eye thereby enhancing the color of his eyes.

1 Claim, 1 Drawing Sheet

5,793,466

1

EYE COLOR HIGHLIGHTING CONTACT LENS

BACKGROUND OF THE INVENTION

1. Field of the Invention

The present invention relates to an eye color highlighting contact lens and more particularly pertains to enhancing the color of a user's iris without changing the eye color.

2. Description of the Prior Art

The use of colored contact lenses is known in the prior art. More specifically, colored contact lenses heretofore devised and utilized for the purpose of coloring a user's eyes are known to consist basically of familiar, expected and obvious structural configurations, notwithstanding the myriad of designs encompassed by the crowded prior art which have been developed for the fulfillment of countless objectives and requirements.

By way of example, U.S. Pat. No. 5,414,477 to Jahnke discloses a colored contact lens having a very natural color appearance.

US. Pat. No. 5,106,182 to Briggs et al. discloses a laminated cosmetic contact lens and method form making same.

U.S. Pat. No. Des. 305,768 to Barkley discloses novelty contact lenses.

U.S. Pat. No. 5,292,350 to Molock et al. discloses a method for preparing tinted contact lenses.

U.S. Pat. No. 5,08,849 to Su et al. discloses a colored contact lens and method for making same.

U.S. Pat. No. 4,867,552 to Neefe discloses eye color changing contact lenses.

While these devices fulfill their respective, particular objective and requirements, the aforementioned patents do not describe an eye color highlighting contact lens for enhancing the color of a user's iris without changing the eye color.

In this respect, the eye color highlighting contact lens according to the present invention substantially departs from the conventional concepts and designs of the prior art, and in doing so provides an apparatus primarily developed for the purpose of enhancing the color of a user's iris without changing the eye color.

Therefore, it can be appreciated that there exists a continuing need for new and improved eye color highlighting contact lens which can be used for enhancing the color of a user's iris without changing the eye color. In this regard, the present invention substantially fulfills this need.

SUMMARY OF THE INVENTION

In the view of the foregoing disadvantages inherent in the known types of colored contact lenses now present in the prior art, the present invention provides an improved eye color highlighting contact lens. As such, the general purpose of the present invention, which will be described subsequently in greater detail, is to provide a new and improved eye color highlighting contact lens and method which has all the advantages of the prior art and none of the disadvantages.

To attain this, the present invention essentially comprises a new and improved eye color highlighting contact lens for use in association with the eye of a user, the eye including a pupil and an iris, the apparatus comprising, in combination: a contact lens fabricated of hydrogel and formed in a generally semispherical configuration, the contact lens having a convex outer surface, a concave inner surface and a periphery, the periphery having an outer diameter and including a dark colored outer circular band positioned adjacent thereto; a center circle being positioned upon the outer surface of the lens and having a diameter of about 35 percent the outer diameter of the lens, in an operative orientation the center circle circumscribing a user's pupil; and a plurality of short, medium and long colored lines, the length of the short lines being about 5 percent of the outer diameter of the lens, the length of the medium lines being about 10 percent of the outer diameter of the lens, the length of the long lines being about 15 percent of the outer diameter of the lens, the lines being positioned in a random array in two generally circular patterns, the first pattern including densely packed short and medium lines and having a diameter of about 45 percent of the outer diameter of the lens, the second pattern including sparsely packed medium and long lines and having a diameter of about 75 percent the diameter of the lens, in an operative orientation a user positioning the lens on his eye thereby enhancing the color of his eyes.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved eye color highlighting contact lens which has all the advantages of the prior art colored contact lenses and none of the disadvantages.

It is another object of the present invention to provide a new and improved eye color highlighting contact lens which may be easily and efficiently manufactured and marketed.

It is a further object of the present invention to provide a new and improved eye color highlighting contact lens which is of durable and reliable construction.

An even further object of the present invention is to provide a new and improved eye color highlighting contact lens which is susceptible of a low cost of manufacture with regard to both materials and labor, and which accordingly is then susceptible of low prices of sale to the consuming public, thereby making such an eye color highlighting contact lens economically available to the buying public.

Still yet another object of the present invention is to provide a new and improved eye color highlighting contact lens which provides in the apparatuses and methods of the prior art some of the advantages thereof, while simultaneously overcoming some of the disadvantages normally associated therewith.

Even still another object of the present invention is to provide a new and improved eye color highlighting contact lens for enhancing the color of a user's iris without changing the eye color.

Lastly, it is an object of the present invention to provide a new and improved eye color highlighting contact lens formed in a generally semispherical configuration, the contact lens having a convex outer surface, a concave inner surface and a periphery; a center circle being positioned upon the outer surface of the lens, in an operative orientation the center circle circumscribing a user's pupil; and a plurality of short, medium and long colored lines, the lines being positioned in a random array in at least one generally circular pattern, in an operative orientation a user positioning the lens on his eye thereby enhancing the color of his eyes.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts through the various Figures.

DESCRIPTION OF THE PREFERRED EMBODIMENT

Figure 1:
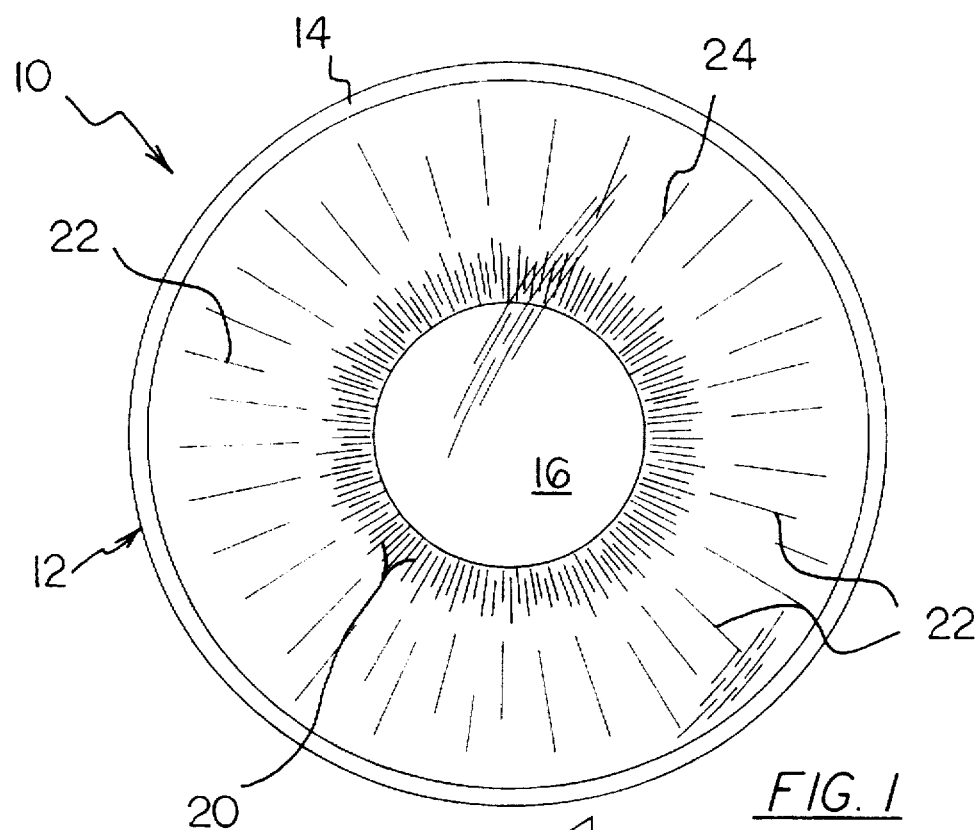
FIG. 1 is a perspective view of the preferred embodiment of the eye color highlighting contact lens constructed in accordance with the principles of the present invention.

With reference now to the drawings, and in particular, to FIG. 1 thereof, the preferred embodiment of the new and improved eye color highlighting contact lens embodying the principles and concepts of the present invention and generally designated by the reference number 10 will be described.

Specifically, it will be noted in the various Figures that the device relates to an eye color highlighting contact lens 10 for enhancing the color of a user's iris without changing the eye color. In its broadest context, the device consists of a contact lens 12, an outer band 14 and a center circle 16. Such components are individually configured and correlated with respect to each other so as to attain the desired objective.

The eye color highlighting contact lens 10 is used in association with an anatomically correct user's eye. The anatomically correct eye includes a centrally positioned pupil and an iris surrounding the pupil. The present invention is adapted be used enhance the natural color of a user's iris without changing the color of the iris. The general population has a variety of different eye colors summarized as follows: blue, green, brown, amber and hazel. The present invention 10 can be utilized with all of these eye colors. Note FIG. 1.

Figure 2:
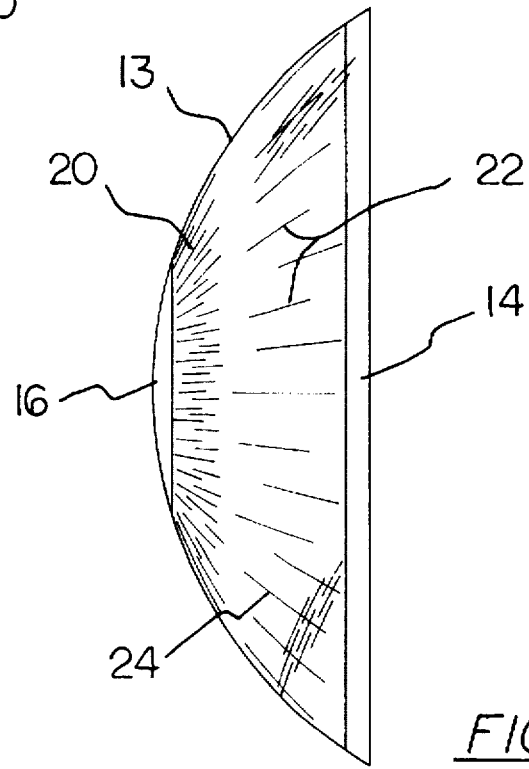
FIG. 2 is a side perspective view of the apparatus illustrating the convex outer surface.

A contact lens 12 is fabricated of hydrogel and formed in a generally semispherical configuration. In alternate embodiments of the apparatus, the contact lens is fabricated of other suitable non-toxic synthetic materials. The contact lens has a convex outer surface 13, a concave inner surface and a periphery. The concave inner surface of the lens is positioned upon a user's cornea. The periphery of the contact lens has an outer diameter and includes a dark colored outer circular band 14. In varying embodiments of the apparatus the outer circular band fabricated in a plurality of different colors to include: black, brown, blue and green. Note FIGS. 1 and 2.

The center circle 16 is positioned upon the outer surface of the lens and has a diameter of about 35 percent the outer diameter of the lens. In an operative orientation the center circle circumscribes a user's pupil. Note FIG. 1.

A plurality of short 20, medium 22 and long 24 colored lines are provided with the apparatus. In varying embodiments of the apparatus the short, medium and long lines are fabricated in a plurality of different colors to include: amber, gold, brown, blue, hazel and green. The variety of different colors allows a user to choose the lens color that best enhances his individual eye color. In the preferred embodiment the length of the short lines is about 5 percent of the outer diameter of the lens, the length of the medium lines is about 10 percent of the outer diameter of the lens and the length of the long lines is about 15 percent of the outer diameter of the lens. In alternate embodiments of the apparatus the length of the short lines is between 2 and 8 percent of the outer diameter of the lens, the length of the medium lines is between 8 and 12 percent of the outer diameter of the lens and the length of the long lines is between 12 and 18 percent of the outer diameter of the lens. Note FIG. 1.

The lines are positioned in a random array in two generally circular patterns. The first pattern includes densely packed short and medium lines and has a diameter of about 45 percent of the outer diameter of the lens. The second pattern includes sparsely packed medium and long lines and has a diameter of about 75 percent the diameter of the lens. In an operative orientation a user positions the lens on his eye thereby enhancing the natural color of his eyes. Note FIG. 1.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A new and improved eye color highlighting contact lens for use in enhancing the natural color of the iris of the user comprising in combination:

a contact lens fabricated of hydrogel and formed in a generally semi-spherical configuration, the contact lens having a convex outer surface, a concave inner surface and a periphery, the periphery having an outer diameter and including a dark colored outer circular band positioned adjacent thereto, the concave inner surface of the contact lens being positioned upon a user's cornea;

a center circle being positioned upon the outer surface of the lens for circumscribing a user's pupil when the contact lens being position upon the eye, the center circle having a diameter of about 35 percent of an outer diameter of the lens; and a plurality of short, medium and long colored lines, the short and medium colored lines radiating from the center circle in a random array, the short, medium and long lines being fabricated in a plurality of different colors chosen from the group of colors consisting of amber, gold, brown, blue, hazel and green, the short lines having a length of about 5 percent of the outer diameter of the lens, the medium lines having a length of about 10 percent of the outer diameter of the lens, the long lines having a diameter of about 15 percent of the outer diameter of the lens, in an operative orientation a user positioning the lens on his eye thereby allowing lighting to reflect off the plurality of lines for enhancement of the color of the eye.

\* \* \* \* \*